United States Patent [19]
Yamaguchi et al.

[11] Patent Number: 5,818,506
[45] Date of Patent: Oct. 6, 1998

[54] IMAGE FORMING APPARATUS HAVING LIGHT BEAMS THAT INTERSECT WITH EACH OTHER BETWEEN FIRST AND SECOND LENS TO PROVIDE AN OPTICAL CHARACTERISTIC

[75] Inventors: Masao Yamaguchi, Kawaguchi; Takashi Shiraishi, Sagamihara, both of Japan

[73] Assignee: Kabushiki Kaisha Toshiba, Kawasaki, Japan

[21] Appl. No.: 619,234

[22] Filed: Mar. 21, 1996

[30] Foreign Application Priority Data

Mar. 23, 1995 [JP] Japan ................................. 7-064229

[51] Int. Cl.$^6$ ........................................................ B41J 2/47
[52] U.S. Cl. ............................................. 347/259; 347/232
[58] Field of Search ................................. 347/259, 260, 347/256, 261, 242, 241, 243, 137, 115, 232

[56] References Cited

U.S. PATENT DOCUMENTS

| | | |
|---|---|---|
| 4,107,701 | 8/1978 | Sprague et al. ............... 346/108 |
| 4,578,688 | 3/1986 | Okuno ............................ 347/118 |
| 5,179,462 | 1/1993 | Kageyama et al. ............ 359/204 |
| 5,181,137 | 1/1993 | Koide ............................ 359/217 |
| 5,276,463 | 1/1994 | Andrews ....................... 346/108 |
| 5,552,863 | 9/1996 | Genovese ...................... 347/137 |

*Primary Examiner*—Mark J. Reinhart
*Attorney, Agent, or Firm*—Foley & Lardner

[57] ABSTRACT

The present invention provides an optical exposer unit having a large space for containing black toner, and a color image forming apparatus comprising the optical exposer unit. In an optical exposer unit, first and second laser beams, which are reflected on the respective reflection surfaces of a polygonal mirror unit and passed in a direction farther from a photosensitive drum than an optical axis of an optical system including first to third image-forming lenses, are reflected on second mirrors, and mutually crossed each other so as to be guided to the photosensitive drum corresponding to third mirrors. Thereby, a sufficient space is provided to the surroundings of a black image forming section. Therefore, the space for containing black toner can be largely ensured as compared with the space for containing the other color toner.

11 Claims, 8 Drawing Sheets

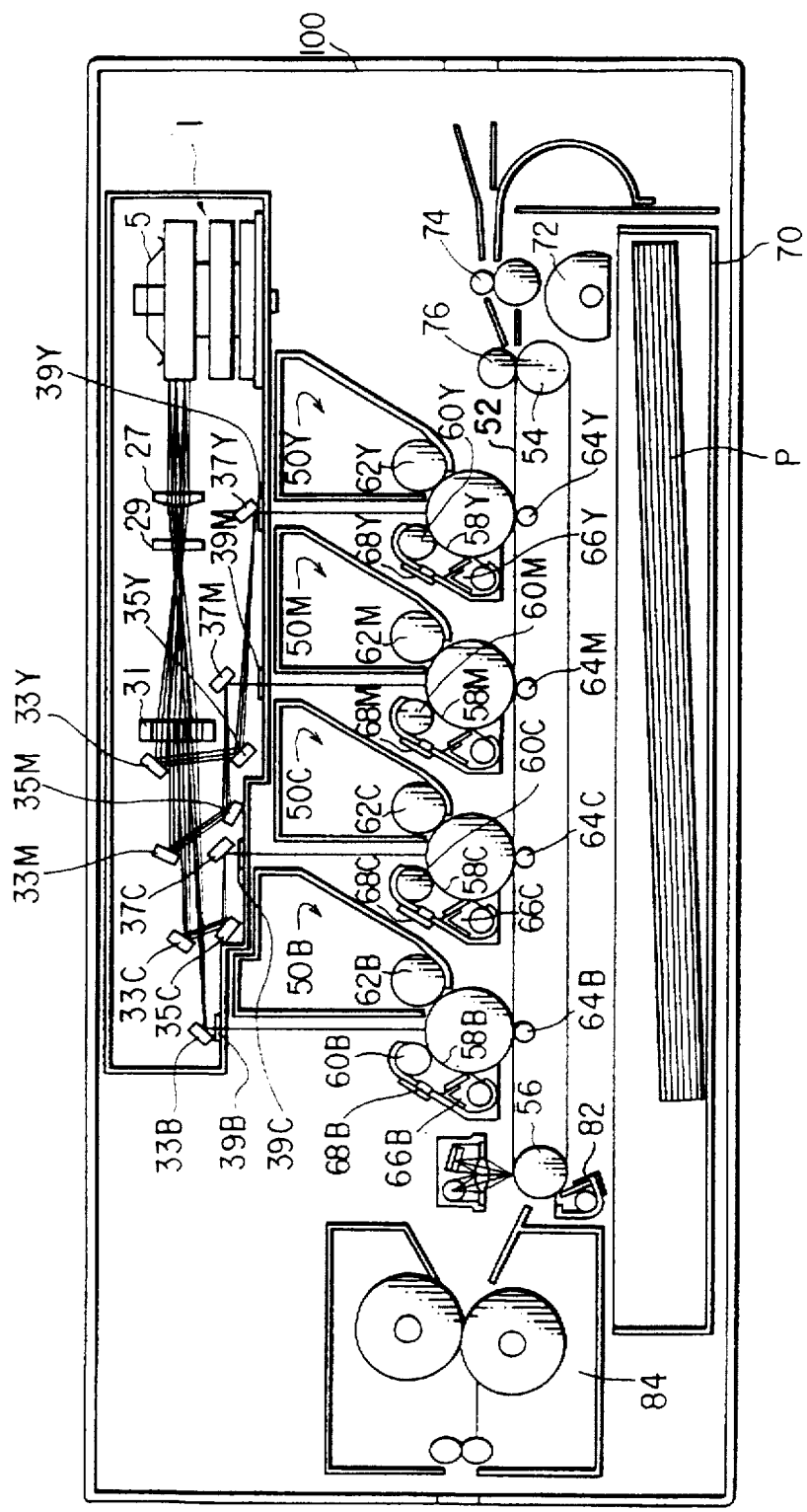
F I G. 1

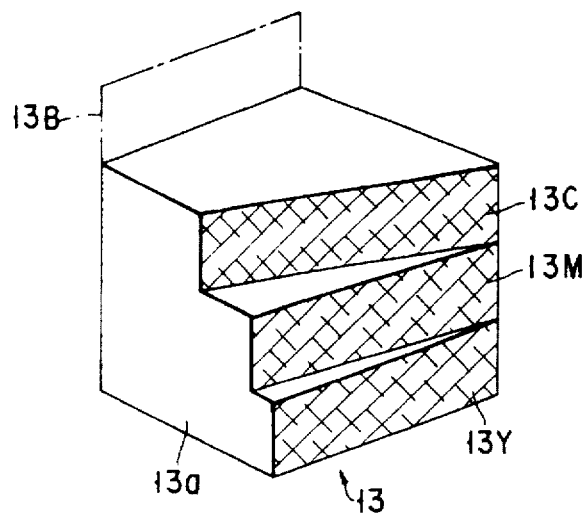
F I G. 4
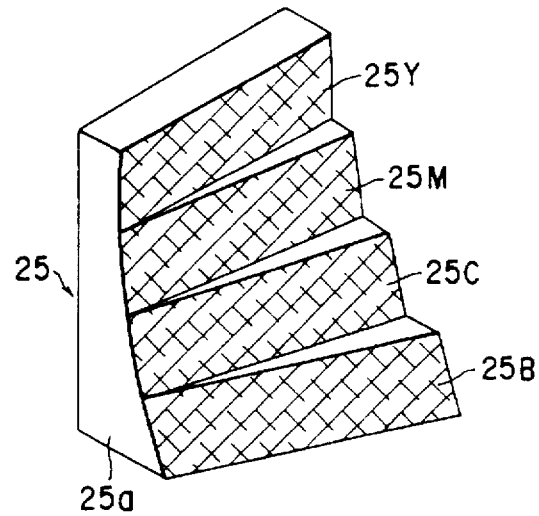
F I G. 5
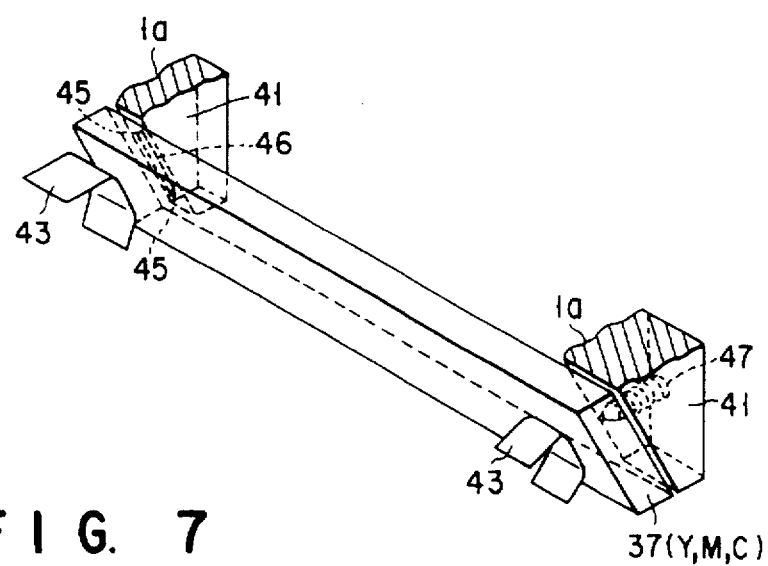
F I G. 7

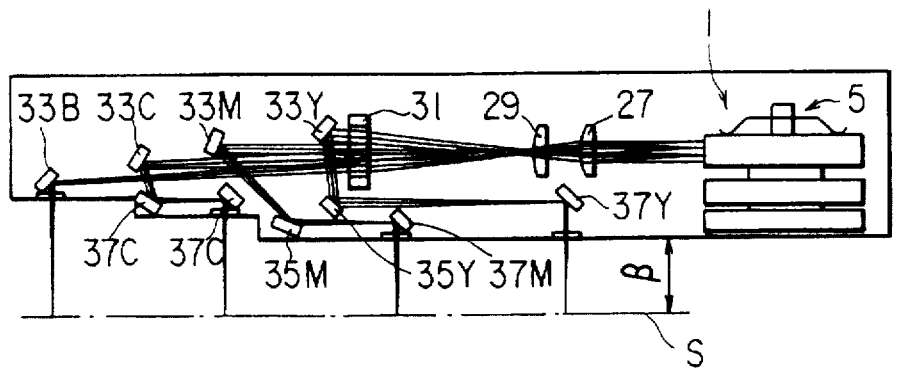
F I G. 8
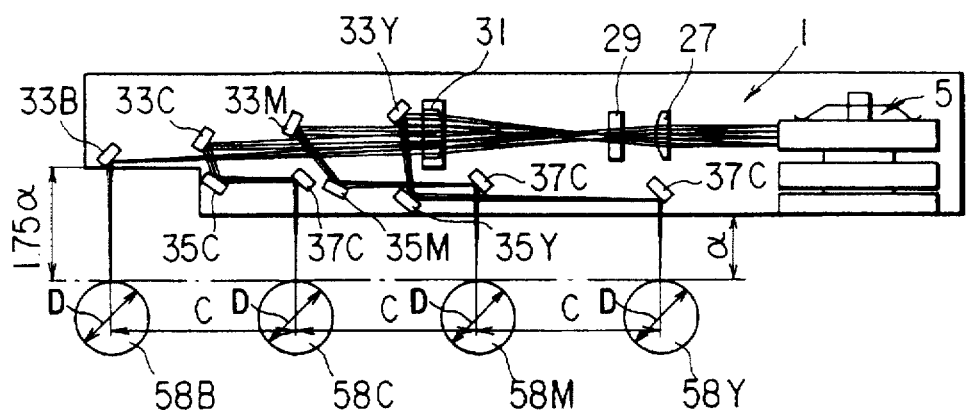
F I G. 9
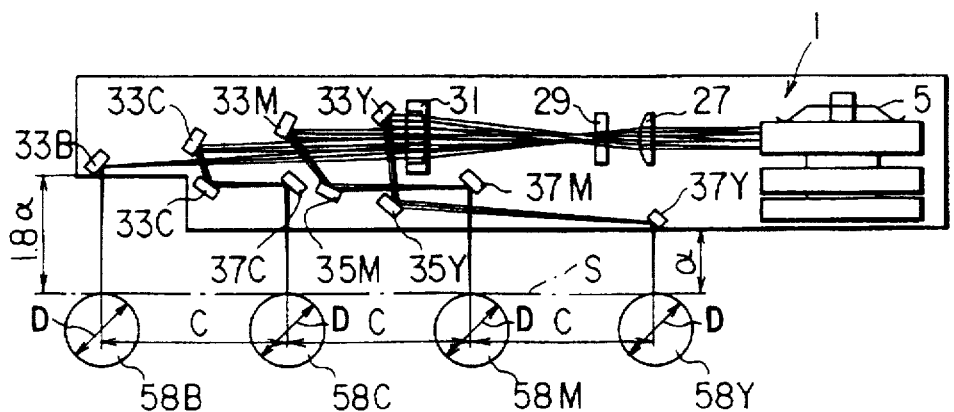
F I G. 10

IMAGE FORMING APPARATUS HAVING LIGHT BEAMS THAT INTERSECT WITH EACH OTHER BETWEEN FIRST AND SECOND LENS TO PROVIDE AN OPTICAL CHARACTERISTIC

BACKGROUND OF THE INVENTION

1. Field of the Invention

The present invention relates to an image forming apparatus such as a color printer apparatus, a high speed copying machine and a color copying machine, each having a plurality of drums.

2. Description of the Related Art

In an image forming unit such as a color printer having a plurality of drums and a color copying machine having a plurality of drums, there are used a plurality of image forming sections for forming an image in accordance with color components, which is color-separated, and a laser exposer unit for providing a plurality of image data, i.e., a plurality of laser beams every color component. As a laser exposer unit, there are known an example in which a plurality of laser exposer units are arranged and an example in which a multi-beam laser exposer unit, which is structured to be able to provide a plurality of laser beams.

In Japanese Patent Application KOKAI Publication No. 5-83485, there is an example using N sets of a light source, a cylinder lens, and glass fθ lens groups, and N/2 of polygon mirrors wherein the number of multi-beams is N. For example, in the case of four beams, four sets of the light source, the cylinder lens glass fθ lens groups, and two polygon mirrors are used.

Japanese Patent Application No. 62-232344 shows an example using a lens in which at least one lens surface of fθ lens is formed to be toric. In Japanese Patent Application No. 62-232344, there is proposed that some of fθ lenses are formed of plastic material, thereby improving degree of freedom in designing each lens surface, and deviation of the aberration characteristics at the position of the image-formation. Japanese Patent Application No. 62-232344 also describes a method for passing all laser beams into an only one set of the fθ lenses.

Japanese Patent Application KOKAI Publication No. 5-34612 describes a method for making the laser beams, which are sent from a plurality of light sources, incident onto one polygon mirror by use of a half mirror.

Japanese Patent Application KOKAI Publication No. 5-83485 discloses a unit in which a unit corresponding to four sets of laser exposer units is incorporated into one housing. As compared with the case using a plurality of exposer units, the space, which is occupied by the laser exposer unit, is reduced in this example. However, from the viewpoint of the single laser exposer unit, the cost of parts and that of the assembly rise. Also, the size and weight rise due to increase in the number of lenses or the number of mirrors. Moreover, it is known that the curve of the main-scanning line of the laser beam of each color component, or the deviation of the aberration characteristic on the image-forming surface such as fθ characteristic becomes uneven due to the error of the shape of the fθ lens or the position error of the attachment. As a result, a miss alignment of color components is generated at the time of a color image forming.

As an example in which the first fθ lens is used in common to the respective laser beams, the second fθ lens, which is provided in each of the laser beams, is shown.

However, due to the error of the shape of the fθ lens or the position error of the attachment, the same disadvantage as in the example described in Japanese Patent Application KOKAI Publication No. 5-83485, is generated.

In the example described in Japanese Patent Application KOKAI Publication No. 62-232344, since only the toric surface whose shape is not optimized is formed, there is a problem in which a curve of the main scanning line is generated in any one of the plurality of the laser beams. In Japanese Patent Application KOKAI Publication No. 62-232344, there is proposed that a part of the laser beam directing to the deflector is controlled to be directed toward the optical axis. However, it is difficult to sufficiently compensate for the aberration characteristics in all image forming areas. Moreover, in Japanese Patent Application KOKAI Publication No. 62-232344, the amount of the refractive index of the lens, formed of plastic, is relatively largely changed by the change of temperature. Due to this, there is generated a problem in which the field curve and the curve of the main scanning line or fθ characteristics are largely varied under the large range of environmental conditions, particularly, the change of the temperature condition. In this example, various conditions such as achromatism in the entire areas of the sub-scanning direction, the field curve, distortion of the image surface and the horizontal magnification must be satisfied. Due to this, there is a problem in which the number of lenses must be increased. Also, in this example, accuracy of the housing must be extremely high to ensure degree of parallelization of the main scanning line of each of the laser beams. Due to this, the manufacturing cost is increased.

In the example described in Japanese Patent Application KOKAI Publication No. 5-34612, light density (amount of light) of the laser beams passing through the maximum number of half mirrors must be sufficiently ensured. Due to this, the size of the light source is enlarged. In this kind of the light scanning apparatus, the optical system of the back stage of the apparatus for separating the laser beam scanned by one scanning apparatus tends to be enlarged.

In consideration of the above-mentioned points, in order to reduce the size of the multi-beam laser scanning apparatus and the manufacturing cost, it is recognized that the following point is useful.

More specifically, only one image forming lens, that is, fθ lens is provided against all laser beams. Moreover, the laser beam, which is directed to the photosensitive lens through the fθ lens, is bent by the plurality of reflection mirrors.

However, if the laser beam directing to the photosensitive drum is bent, there is generated a case in which the space between the multi-beam laser scanning apparatus and the respective image forming sections is reduced more than necessity. Due to this, the size of the toner cartridge, which is provided to be integral with each of the image forming sections, is limited, and the number of times of toner supply or the number of time of replacement of the toner cartridge is increased.

Moreover, in the color image forming apparatus in which the multi-beam laser scanning apparatus is used, as compared with the frequency of which the color image is formed, the frequency of which the monochromatic image is formed with block toner becomes higher. Particularly, there is a problem in which only the number of times of black toner supply or the number of time of replacement of the black toner cartridge is increased.

SUMMARY OF THE INVENTION

An object of the present invention is to provide a laser exposer unit whose thickness is small.

Another object of the present invention is to provide a laser exposer unit in which the size of a cartridge for containing block toner can be enlarged as compared with a cartridge for containing the other toner.

In order to achieve the above object, according to a first aspect of the present invention, there is provided an optical exposer unit comprising: scanning means for continuously reflecting a plurality of light beams toward a scanning object; image-forming means for image-forming the light beams reflected by the scanning means on a predetermined position of the scanning object; the image-forming means including: optical means for providing a predetermined optical characteristic to each of the light beams; first reflecting means provided between the optical means and the scanning object with respect to the light beams; and second reflecting means, provided at the side of the scanning object rather than the first reflecting means with respect to the light beams, for crossing at least two of the light beams reflected by the first reflecting means each other so as to further reflect the light beams toward the scanning object.

Also, according to a second aspect of the present invention, there is provided an optical exposer unit comprising: a first light source for emitting a first light beam corresponding to a first image; a second light source for emitting a second light beam corresponding to a second image; first optical means for putting the first and second light beams sent from the first and second light sources together to form a group of light beams as one flux of light ray; scanning means for continuously reflecting the group of light beams put together by the first optical means toward a scanning object; a second optical means for separating the group of light beam passed through the scanning means into the first and second light beams again, and for providing a predetermined optical characteristic to the first and second light beams such that each of the first and second light beams has a predetermined cross sectional shape when each of the first and second light beams reaches the scanning object; first reflecting means including i number of reflectors, and a number of the first reflecting means being at least two or more with respect to the first light beam passing through the farthest position from the scanning object to sandwich an optical axis therebetween among the light beams passed through the second optical means; and second reflecting means including j number of reflectors, and a number of the second reflecting means being at least two or more with respect to the second light beam passing through a position between the first light beam and the optical axis, the second light reflecting means arranged such that the light beam directing from a reflector j-1 of the second reflecting means to a reflector j is passed between a reflector i-1 of the first reflecting means and a reflector i-2, and the second reflecting means reflecting the first light beam such that an angle formed by an incident angle and a reflection angle is obtuse so as to be guided to the scanning object.

Moreover, according to a third aspect of the present invention, there is provided an image forming apparatus comprising: a plurality of image carrier members; an optical exposer unit, having: a plurality of light sources arranged to correspond to the plurality of image carrier members, scanning means for continuously reflecting light beams emitted from the plurality of light sources toward a predetermined position of the corresponding image carrier members, optical means for providing a predetermined optical characteristic to each of the plurality of the light beams, and image-forming means for image-forming the light beam reflected by the scanning means onto a predetermined position of the image carrier member, the image forming means including first reflecting means first reflecting means provided between the optical means and the image carrier member with respect to each of the plurality of the light beams, and second reflecting means, provided at the side of the image carrier member rather than the first reflecting means with respect to each of the light beams, for crossing at least two of the light beams reflected by the first reflecting means each other so as to further reflect the light beams toward the image carrier member; and a developing unit for supplying developing agent to an latent image formed on the image carrier member by the laser exposer unit so as to form a developing image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic cross sectional view of a color image forming apparatus of an embodiment of the present invention;

FIG. 4 is a schematic perspective view of a mirror block of the laser exposer unit of FIG. 2;

FIG. 5 is a schematic perspective view of a mirror for detecting a horizontal sync of the laser exposer unit of FIG. 2;

FIG. 7 is a schematic perspective view showing an adjusting mechanism of an emission of the laser exposer unit of FIG. 2;

FIG. 8 is a schematic cross sectional view showing a conventional laser exposer unit;

FIG. 9 is a cross sectional view showing another example of the laser exposer unit of FIG. 2;

FIG. 10 is a cross sectional view showing further another example of the laser exposer unit of FIG. 2;

DETAILED DESCRIPTION OF THE PREFERRED EMBODIMENTS

Figure 2:
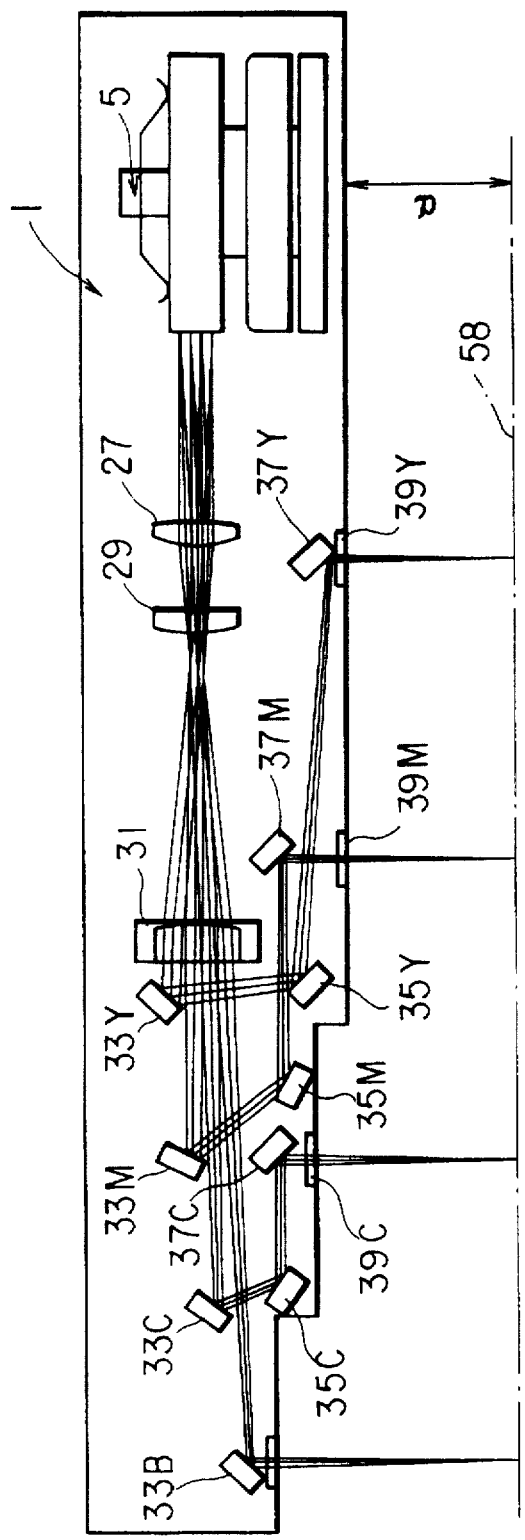
FIG. 2 is a cross sectional view of a laser exposer unit for use in the image forming apparatus of FIG. 1.

An embodiment of the present invention will be described with reference to the drawings.

FIG. 1 is a front cross sectional view of a color image forming apparatus of a quadruple-drum system.

An image forming apparatus 100 has first to fourth image forming units 50Y, 50M, 50C, and 50B for forming an image of each of components, which are color-separated into Y (Yellow), M (Magenta), C (Cyan), and B (Black).

In general, according to the multi-color laser beam printer device as shown in FIG. 1, a unit and image data are discriminated by the subscripts of Y (Yellow), M (Magenta), C (Cyan), and B (Black). In other words, in the color laser beam printer, image data, which is separated into four colors Y, M, C, and B, and an image forming unit corresponding to each image data are generally used.

The respective image forming units 50 are provided under a laser exposer unit 1 in series in order of 50Y, 50M, 50C, and 50B so as to correspond to the position where the laser beams LY, LM, LC, LB corresponding to the respective color components are emitted through the respective third mirrors 37Y, 37M, 37C, and 33B.

A transfer belt 52 is provided under the respective image forming units 50 to transfer an image formed by the respective image forming units 50Y, 50M, 50C, and 50B.

The transfer belt 52 is stretched onto a belt drive roller 56 and a tension roller 54, and rotated at a predetermined speed in a direction where the belt drive roller 56 is rotated.

The respective image forming units 50Y, 50M, 50C, and 50B include photosensitive members 58Y, 58M, 58C, and 58B. The photosensitive members 58Y, 58M, 58C, and 58B, which are shaped like a cylindrical drum to be rotatable in a direction of an arrow, form an electrostatic latent image corresponding to each image.

There are arranged charge units 60 (Y, M, C, B), developing units 62 (Y, M, C, B), transfer units 64 (Y, M, C, B), cleaners 66 (Y, M, C, B), and discharge units 69 (Y, M, C, B) around the respective photosensitive members 58Y, 58M, 58C, and 58B in order of the rotational direction of the photosensitive members 58 (Y, M, C, B).

Each of the charge units 60 provides a predetermined voltage on the surface of each of the respective photosensitive members 58 (Y, M, C, B).

Each of the developing units 62 develops the electrostatic latent image on the surface of each of the photosensitive members 58 with toner to which the corresponding color is provided.

Each of the transfer units 64 transfers a toner image, which is formed on each of the photosensitive members 58, to a recording medium, which is transferred through the transfer belt 52, in a state that the transfer belt 52 is provided between each of the photosensitive members 58 and each of the transfer units 64 to be opposite to each of the photosensitive members 58.

Each of the cleaners 66 removes the residual toner, which is left on each of the photosensitive members 58 after each toner image is transferred through each of the transfer units 64.

Each of the discharge units 68 removes the residual voltage, which is left on each of the photosensitive members 58 after each toner image is transferred through each of the transfer units 64.

Irradiation of the respective laser beams LY, LM, LC, and LB, which are guided by the respective mirrors 37Y, 37M, 37C, 33B of the laser exposer unit 1, is provided between the respective charge units 60 (Y, M, C, B) and the respective developing units 62 (Y, M, C, B).

A paper cassette 70 is provided under the transfer belt 62 to contain the recording medium for transferring the image formed by each of the image forming units 50 (Y, M, C, B), that is, paper P.

A feeding roller 72 having a semicircular cross section is provided at the position, which is one end portion of the paper cassette 70 and a portion close to the tension roller 54, so as to pick up paper P contained in the paper cassette 70 one by one from the uppermost section.

A resist roller 74 is provided between the feeding roller 72 and the tension roller 54. The resist roller 74 is used to conform the top end of one paper P, which is picked up from the cassette 70, to the top end of each toner image formed on the respective image forming units 50, particularly the toner image formed on the photosensitive member 58B by the image forming unit 50B.

There is provided an absorption roller 74 at a portion between the resist roller 74 and the first image forming unit 50Y, that is, a portion close to the tension roller 54, substantially on an outer periphery of the tension roller 54. The absorption roller 76 provides a predetermined electrostatic absorption. The axis of the absorption roller 76 and the tension roller 54 are arranged to be parallel with each other.

There are provided resist sensors 78 and 80 at a portion, which is one end transfer belt 52, and close to the belt drive roller 56, substantially on an outer periphery of the belt drive roller 56 to have a predetermined distance in an axial direction of the belt drive roller 56. The resist sensors 78 and 80 detect the position of the image formed on the transfer belt 52 (FIG. 1 is the front cross sectional view showing only the back sensor 80).

A transfer belt cleaner 82 is provided on the transfer belt 52 corresponding to the outer periphery of the belt drive roller 56. The transfer belt cleaner 82 removes toner adhered onto the transfer belt 52 or paper dust from paper P.

A fixing unit 84 is provided in a direction where paper P transferred through the transfer belt 52 is detached from the tension roller 56 and further transferred. The fixing unit 84 is used to fix the toner image, which is transferred onto the paper P, to paper P.

FIG. 2 is a schematic cross sectional view of a multi-beam laser scanning apparatus, which is used in the image forming apparatus of FIG. 1.

According to FIG. 2, the multi-beam laser exposer unit 1 has first to fourth semiconductor lasers (plurality of light sources) 3Y, 3M, 3C, and 3B and a polygonal mirror unit 5 (deflecting means). The first to fourth semiconductor lasers 3 (Y, M, C, B) generate first to fourth laser beams LY, LM, LC, and LB corresponding to image data, which is color-separated in accordance with color components, respectively. The polygonal mirror unit 5 deflects each of the laser beams LY, YM, LC, and LB emitted from each of the lasers 3Y, 3M, 3C, and 3B toward the image-forming object, which is provided at a photosensitive member to be described later, at a predetermined constant angular speed.

The semiconductor laser 3Y, 3M, 3C, and 3B are arranged in order of 3Y, 3M, 3C, and 3B toward the polygonal mirror unit 5 to have a predetermined angle. The laser 3B corresponding to the B (Black) image is provided such that the laser beam LB, directing from the laser 3B toward the reflecting surface of the polygonal mirror unit 5, can be made incident onto the polygonal mirror unit 5 without being reflecting by mirrors to be described later.

Figure 3:
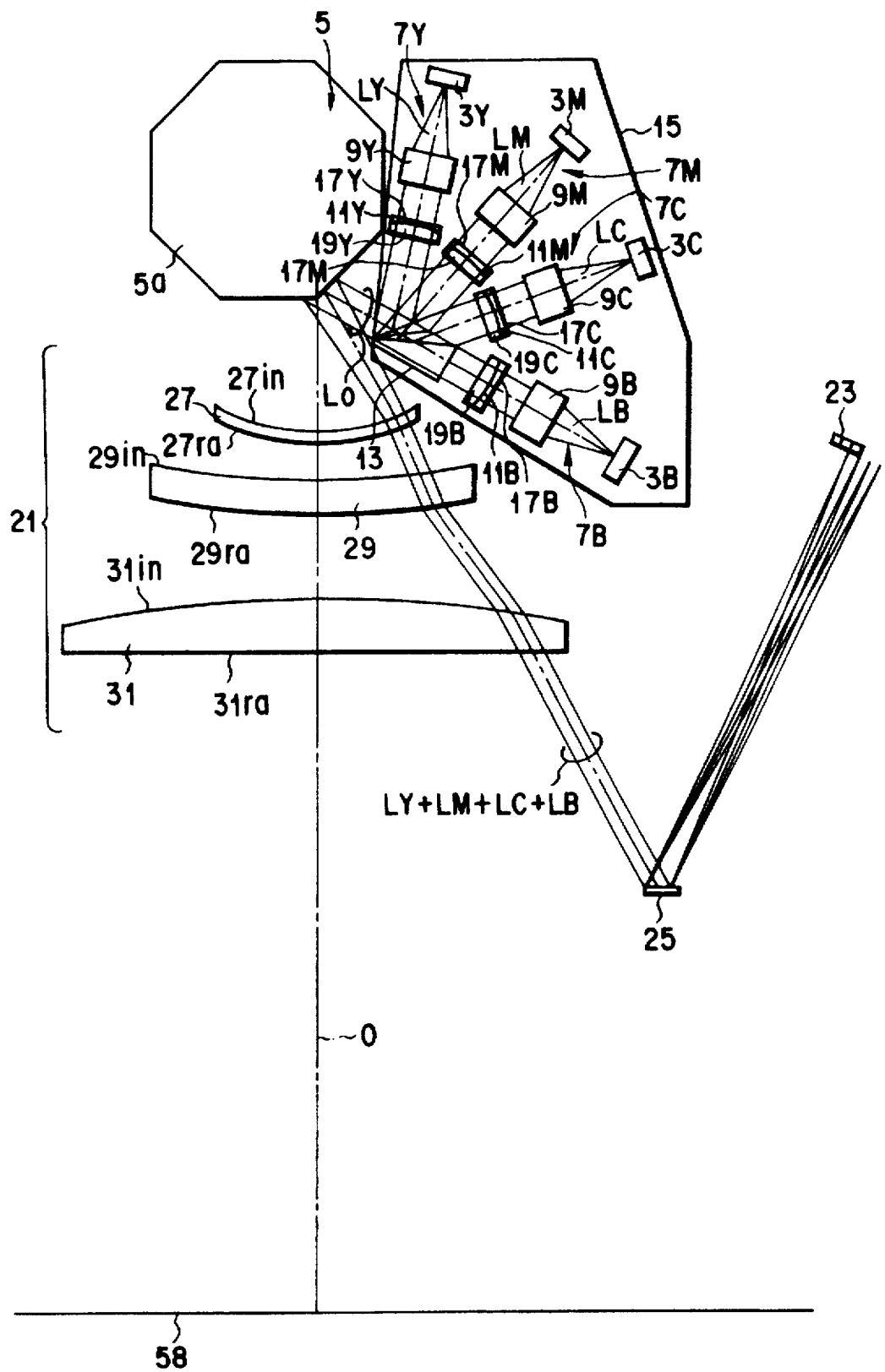
FIG. 3 is a view of an optical path of the laser exposer unit of FIG. 2 is expanded.

As shown in FIG. 3, a plurality of pre-deflection optical systems (first optical means) 7 (Y, M, C, B) is provided between each of the lasers 3 (Y, M, C, B) and the polygonal mirror unit 5. The pre-deflection optical systems 7 (Y, M, C, B) are light source side optical systems, which are used such that the cross section beam spot of each of the laser beams LY, LC, LM, and LB is adjusted to have a predetermined shape.

The polygonal mirror unit 5 includes a polygonal mirror body 5a in which eight-face plane reflectors are arranged in a shape of a regular polygon, and a motor 5m, which rotates the polygonal mirror body 5a in a predetermined direction at a fixed speed. The polygonal mirror body 5a is formed of, for example, an aluminum alloy.

The pre-deflection optical systems 7 (Y, M, C, B) have finite focal lenses 9 (Y, M, C, B), hybrid cylinder lenses 11 (Y, M, C, B), respectively, and only one pre-deflection mirror block 13. Each of the finite focal lenses 9 (Y, M, C, B) of the first optical means L (Y, M, C, B), which are emitted from each of the lasers 3 (Y, M, C, B), in both a main-scanning direction, and a sub-scanning direction. The main-scanning direction is a first direction where the laser beams L (Y, M, C, B) are deflected by the polygonal mirror unit 5, and the sub-scanning direction is a second direction, which is perpendicular to the first direction. Each of the hybrid cylinder lenses 11 (Y, M, C, B) of the first optical means provides further convergence to the laser beam passed through the finite focal lenses 9 (Y, M, C, B) only in the sub-scanning direction. The mirror block 13 of the first optical means is used to bend each of three laser beams passed through the hybrid cylinder lens 11 (Y, M, C, B) toward each of the reflecting surfaces of the polygonal mirror unit 5. The laser beams 3 (Y, M, C, B), the finite focal lenses (Y, M, C, B), the hybrid cylinder lenses 11 (Y, M, C, B) and the mirror block 13 are integrally arranged on a support member 15, which is formed of, for example, an aluminum alloy.

As the finite focal lenses 9 (Y, M, C, B), there is used an aspherical glass lens or a lens formed by adhering an UV (ultraviolet) light-harding plastic-made aspherical portion to the surface of the spherical glass lens. The respective finite focal lenses 9 (Y, M, C, B) are fixed onto the support member 15, which are formed of material having substantially the same coefficient of thermal expansion as the support member 15, such as a barrel, a lens tube, a lens holding member, a lens holding ring, a lens sleeve or a lens holder.

The hybrid cylinder lenses 11 (Y, M, C, B) include plastic cylinder lenses 17 (Y, M, C, B) and glass cylinder lenses 19 (Y, M, C, B), respectively. Substantially the same radius of curvature is provided to the plastic cylinder lenses 17 and the glass cylinder lenses 19 in the sub-scanning direction.

The plastic cylinder lenses 17 (Y, M, C, B) are formed of material such as RMMA (polymethyl methacrylate), and the glass cylinder lenses 19 (Y, M, C, B) are formed of, for example, SFS1. The plastic cylinder lenses 17 and the glass cylinder lenses 19 are fixed onto the support member 15 through lens holding member (not shown), which are formed of material having substantially the same coefficient of the thermal expansion as the support member 15. The finite focal lenses 9 (Y, M, C, B) and the hybrid cylinder lenses 11 (Y, M, C, B) may be supported by the same lens holding member.

FIG. 4 shows a mirror block 13, which is mounted on the laser exposer unit of FIG. 2, in detail.

The mirror block 13 includes a block body 13a and a plurality of mirror portions 13 (Y, M, C). The block body 13a is formed of material having a low coefficient of thermal expansion such as an aluminum alloy. Each of the mirror portions 13Y, 13M and 13C are arranged on a predetermined surface of the block body 13a. The number of the mirror portions is set to be one less than the number of colors separated in accordance with the color component, which can be image-formed.

According to FIG. 4, the mirror block 13 is used to guide the first to fourth laser beams L (Y, M, C, B), serving as one flux of the laser beam, to the respective reflecting surfaces of the polygonal mirror unit 5.

More specifically, the mirror block 13 in the first optical means includes first to third reflecting surfaces 13Y, 13M, and 13C, and a passing area 13B. The first reflecting surface 13Y is used to bend the laser beam LY emitted from the laser 3Y to be guided to each of the reflecting surfaces of the polygonal mirror unit 5 (deflecting means). The second and third reflecting surfaces 13M and 13C are used to bend the laser beam 3C toward each of the reflecting surfaces of the polygonal mirror unit 5. The passing area 13B is used to directly guide the laser beam LB from the laser 3B to each of the reflecting surfaces of the polygonal mirror unit 5.

Each of these reflecting surfaces 13Y, 13M, and 13C is cut at a predetermined angle to the laser beam LB directly moving through the block body 13a. Thereafter, the cut surface is coated with material having high reflectance such aluminum or such a material is deposited thereon. The cut surfaces may be polished.

According to the mirror block of FIG. 4, since the reflecting surfaces 13Y, 13M, and 13C are cut from one block body 13a, the relative inclination error of each mirror is reduced. As a method for manufacturing the block body 13a, a die-cast method can be used. Therefore, there can be obtained a mirror block having high precision.

As already explained above, the laser beam LB from the laser 3B is passed through the passing area 13B on the block body 13a without crossing the mirror block 13 to be directly guided to each of the reflecting surfaces of the polygonal mirror unit 5.

Referring to FIG. 3 again, there are provided between the polygonal mirror unit 5 and the photosensitive member 58 (Y, M, C, B) a post-deflection optical system 21 (second optical means), a horizontal sync detector 23, and a mirror block 25 (third optical means) for a horizontal sync. The post-deflection optical system 21 is used to substantially linearly image-form each of the laser beams L (Y, M, C, B), which are deflected by the respective reflecting surfaces of the polygonal mirror unit 5, at a predetermined position of the photosensitive member 58 (Y, M, C, B). The horizontal sync detector 23 detects a part of the respective laser beams L (Y, M, C, B), which are passed through the post-deflection optical system 21, so as to define a generation timing of a horizontal sync signal to be described later. The mirror block 25 is provided between the post-deflection optical system 21 and the horizontal sync detector 23 to reflect a part of the four laser beams L (Y, M, C, B), which are passed through the post-deflection optical system 21, toward only one horizontal sync detector 23.

The post-deflection optical system 21 includes first to third image-form lenses 27, 29, and 31 so as to provide a predetermined aberration characteristic to four laser beams L (Y, M, C, B), which are deflected by the respective reflecting surfaces of the polygonal mirror unit 5, in the wide scanning width, that is, the entire length area of the main-scanning direction at the photosensitive member 58 (Y, M, C, B) of the laser beam scanned on the image surface by the polygonal mirror unit 5. Also, the first to third image-form lenses 27, 29, and 31 are used to control the variation of the photosensitive member 58 (Y, M, C, B) of each laser beam.

There are provided a first group of mirrors 33 (Y, M, C, B) (first optical elements), and a second group of mirrors 35 (Y, M, C) and a third group of mirrors 37 (Y, M, C) (second optical elements) between the third image-form lens 31 of the post-deflection optical system 21 and the photosensitive member 58 (Y, M, C, B). As is obvious from FIG. 2, the laser beam LB corresponding to the B (black) image is bent by the first mirror 33B, and guided to the photosensitive drum 58B without reflecting through the other mirrors. In other words, the second mirrors 35 (Y, M, C) and the third mirrors 37 (Y, M, C) are respectively arranged with respect to the three laser beams LY, LM and LC. Then, the laser beam LY, which is relected on each reflection surface of the polygonal mirror unit 5 is passed in the direction farther away from the photosensitive drum 58 (Y, M, C, B) than the optical axis O of the first to third image-form lenses 27, 28, and 31. Also, the laser beam LM which is reflected on each reflection surface of the polygonal mirror unit 5 is passed between the laser beam LY and the optical axis O. Then, these laser beams LY and LM are reflected by the second mirrors 35Y and 35M, and crossed with each other. Thereafter, these laser beams LY and LM are guided to the corresponding photosensitive drums 58Y and 58M by the third mirrors 37Y and 37M.

When the number of the mirrors 33Y to 37Y is shown by 1 to i and the number of the mirrors 33M to 37M is shown by 1 to j, the first and second laser beams LY and LM, which are scanned through each of the polygonal mirror unit 5 are arranged such that the laser beam directing from j-1 of the second mirror group to j can be passed through a portion between the first mirror group i-1 and i-2. In this case, an angle, which is formed by the incident angle and the emission angle, on the mirror 37Y is defined to be an obtuse angle larger than 90°.

The first to third image-form lenses 27, 29 and 31, the first mirrors 33 (Y, M, C, B), and the second mirrors 35 (Y, M, C) are fixed to a plurality of fixing members (not shown), which are integrally formed in an intermediate base 1a of the laser exposer unit 1, with adhesive. Also, the third mirrors 37 (Y, M, C) are arranged to be movable to at least one direction with respect to the sub-scanning direction (shown in FIG. 7 to be described later) through a fixing rib and an inclination adjusting mechanism, which are integrally formed in the intermediate base 1a.

There are arranged dust-proof glasses 39 (Y, M, C, B) for preventing dust from being entered the inferior of the laser exposer unit 1 across the each of optical passes between the mirror 33B and the photosensitive drum 58B, the mirror 37Y and the photosensitive drum 58Y, the mirror 37Y and the photosensitive drum 58M and the mirror 37C and the photosensitive drum 58C, respectively.

Backing to FIG. 2, the laser beams L (Y, M, C) are passed through the optical path including the third mirrors (the number of the mirrors: three), and output from the laser exposer unit 1, respectively. As mentioned above, the number of the mirrors, which is provided in the optical path, is set to an odd number (one or three), and this point is useful to adjust the direction of the curve of the main-scanning line of each laser beam, which is caused by the inclination of any one of lenses, to the same phase (direction).

The following will specifically explain the optical characteristic of the hybrid cylinder lens 11Y.

Regarding the first to third image-forming lenses 27, 29, and 31 of the post-deflection optical system 21 (second optical means), these lenses are formed of plastic such as PMMA. Due to this, for example, it is known that a refractive index n is varied from 1.4876 to 1.4789 when the peripheral temperature is varied between 0° to 50° C. In this case, the sub-scanning direction image forming position is varied about ±12 mm when the laser beam, which is passed through the first to third image forming lenses 27, 29, and 31, is actually condensed on the photosensitive member 58 (Y, M, C, B).

In order to reduce the above variation, the lenses having the same material as lenses used in the post-deflection optical system 21 are incorporated into the pre-deflection optical system (first optical system) 7 (Y, M, C, B) in an optimum curve state. Thereby, the variation of the sub-scanning direction image forming position, which is caused by the change of the refractive index n due to the temperature change, can be reduced to about ±0.5 mm when the laser beam passed through the first to third image forming lenses 27, 29, and 31 is actually condensed on the photosensitive member 58 (Y, M, C, B). Due to this, as compared with the conventional optical system in which the predeflection optical system 7 (Y, M, C, B) is formed of glass lenses and the post-deflection optical system 21 is formed of plastic lenses, it is possible to correct the color aberration of the sub-scanning direction, which is caused by the variation of the refractive index due to the temperature change of the lenses of the post-deflection optical system 21.

Figure 6:
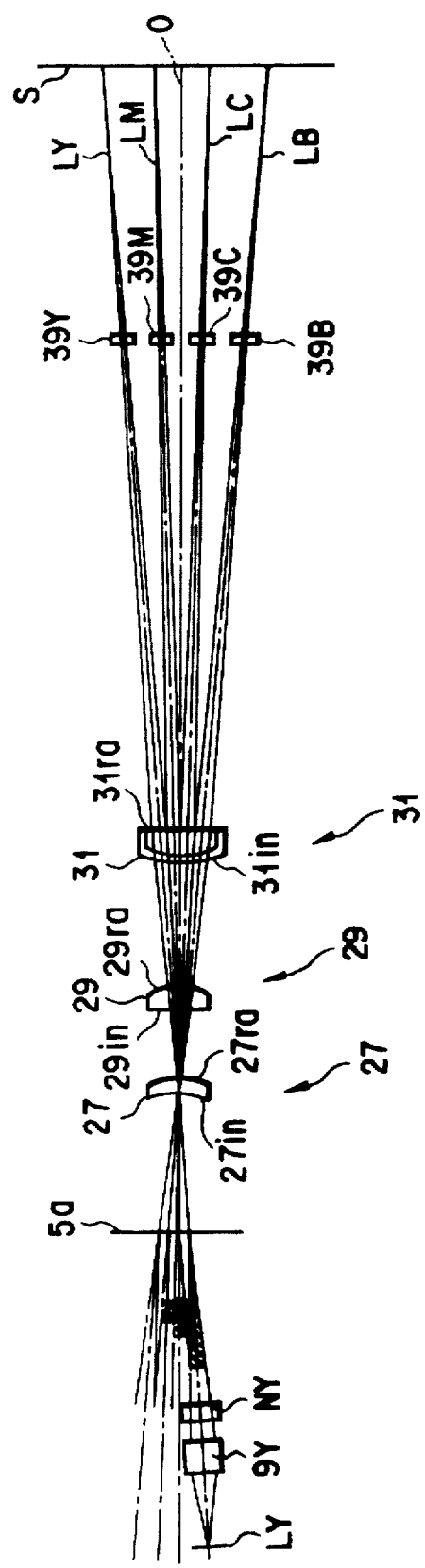
FIG. 6 is a cross sectional view of an optical path of the laser exposer unit of FIG. 2.

As is obvious from FIG. 6, each of the laser beams LY, LM, LC, and LB is made symmetrically incident onto the optical axis O (optical axis of the system) of the laser exposer unit 1 in the sub-scanning direction. In other words, the laser beams LY and LB are made symmetrically incident onto the polygonal mirror 5a to sandwich the optical axis O. Also, the laser beams LM and LC are made symmetrically incident onto the polygonal mirror 5a to sandwich the optical axis O. Therefore, regarding the respective laser beams, the optimum post-deflection optical system 21 can be obtained at two portions of the sub-scanning is direction. Due to this, characteristics such as the field curve and/or astigmatism can be improved. In this case, by the optimum post-deflection optical system 21 may be reduced.

The following will explain intensity (amount of light) of each laser beam, which is reflected on the mirror block 13 and guided to each of the reflecting surfaces of the polygonal mirror unit 5.

As a method for making two or more laser beams incident onto the reflecting surfaces of the polygonal mirror unit 5 as one flux of the laser beam, Japanese Patent Application KOKAI Publication No. 5-34612 already proposes a method in which the laser beams are sequentially overlaid on each other by the plate beamsplitter. However, it is well known that 50% of the amount of the laser beam emitted from the laser is made useless every reflection and transmission (every time when the laser beam is passed therethrough) due to the use of the plate beamsplitter. In this case, even if transmissivity of the plate beamsplitter and reflectance thereof are made suitable in accordance with each laser beam, light intensity (amount of light) of any one of the laser beams to be passed through the plate beamsplitter is reduced to about 25%. Moreover, it is well known that that there is generated a difference between the respective laser beams in terms of the field curve and astigmatism. The generation of such a difference is caused by the following points.

More specifically, the plate beamsplitter is inclined in the optical path. Also, the number of the plate beamsplitters where the beam is passed through is different. On the other hand, since the field curve and astigmatism of the respective laser beams are different, it is difficult for all laser beams to be image-formed by the same finite focal lens and the cylinder lens.

In contrast, according to the mirror block 13 shown in FIG. 4, the laser beams LY, LM, and LC are bent by the normal mirror at a position placed before the polygonal mirror 5a of the polygonal mirror unit 5 and an area where the respective laser beams are mutually separated in the sub-scanning direction. Therefore, the amount of light of each laser beam, which is be supplied to the photosensitive member 58 by the polygonal mirror 5a, can be maintained to be about 90% or more of the amount of emitted light from the finite focal lens 9. Whereby, the output of each laser can be reduced, and the aberration of light to be reduced at the photosensitive member 58 can be corrected to be equal, thereby making it possible to reduce the beam spot and lead to high precision. The laser 3B corresponding to B (black) is passed through the passing area 13B of the mirror block 13 to be guided to the polygonal mirror 5a. Due to this, the output capacity of the laser can be reduced, and the error of the incident angle onto the polygonal mirror 5a, which is caused by the reflection from the reflecting surface, can be removed.

FIG. 5 shows only one mirror, which can guide the respective laser beams LY, LM, LC, and LB, which are passed through the optical path shown in FIG. 3 and deflected to the photosensitive drum 58, to the horizontal sync detectors.

In FIG. 5, the mirror block 25 (third optical means) has first to fourth mirror surfaces 25Y, 25M, 25C, and 25B, and a mirror block 25a for holding the mirror surfaces 25Y, 25M, 25C, and 25B as one unit. The first to fourth mirror surfaces 25Y, 25M, 25C, and 25B are formed at a different angle to both the main-scanning direction and the sub-scanning direction in order to reflect the respective laser beams L (Y, M, C, B) in the main-scanning direction at a different timing against the detector 23, and to provide substantially the same level (height) on the detector 23 in the sub-scanning direction.

The mirror block 25a is formed of, for example, polycarbonate containing glass. The respective mirror mirror surfaces 25Y, 25M, 25C, and 25B of the mirror block 25a are formed to be as one unit at a predetermined angle. Or, metallic material such as aluminum is deposited on portions cut from the mirror block 25a. The mirror surfaces are shaped to be removed from the mold without providing an under-cut at the portions corresponding to the mirror surfaces.

As mentioned above, the respective laser beams LY, LM, LC and LB, which are deflected by the polygonal mirror unit 5, can be made incident onto one detector 23. In addition, there can be solved the problem of sensitivity of each detector and the shift of the horizontal sync signal, which are caused in the unit having the plurality of detectors. It is needless to say that the laser beams are made incident onto the detector 23 four times per one line of the main-scanning direction by use of the mirror block 25.

Back to FIG. 2, the following will explain the relationship among the inclination of each of the laser beams L (Y, M, C, B), the mirror 33B (first optical element), and the mirrors 37 (Y, M, C) (second optical element).

As explained above, the laser beams L (Y, M, C, B) to which the predetermined aberration characteristics are provided through the first to third toric lenses 27, 29, and 31 after being reflected by the polygonal mirror 5a, are separated and/or bent in the predetermined direction through the first mirrors 33 (Y, M, C, B).

The laser beam LB corresponding to B (black image) is reflected by the first mirror 33B, and passed through the dustproof glass 39B to be guided to the photosensitive member 58B, has been diserived. The other laser beams L (Y, M, C) are guided to the second mirrors 35 (Y, M, C), respectively, and reflected toward the third mirrors 37 (Y, M, C) by the second mirrors 35 (Y, M, C). The respective laser beams L (Y, M, C), which are reflected by the third mirrors 37 (Y, M, C), are image-formed on the photosensitive member 58 (Y, M, C) with substantially an equal interval through the dustproof glasses 39 (Y, M, C).

As explained above, the laser beam LB emitted from the laser 3B is passed through the pre-deflection optical system 7B excepting the mirror block 13, that is, the finite focal lens 9 and the hybrid cylinder lens 11B, and reflected by the polygonal mirror 5a. Thereafter, the laser beam LB is passed through the post-deflection optical system 21, that is, the first to third toric lenses 27, 29, and 31, and reflected by the mirror 33B to be emitted to the outer unit of the laser exposer unit 1. In other words, the laser beam LB, which is emitted from the laser 3B, is reflected by only the polygonal mirror 5a and the mirror 33B, and emitted from the laser exposer unit 1. Thereby, the laser beam LB, which is guided by only one mirror 33B after deflection, can be ensured. In a case where a plurality of mirrors is presented in the optical path, the laser beam LB is useful as a reference beam of light in relatively correcting the other laser beams in connection with the variation of the aberration characteristics of the image-formed surface, which is increased (multiplied) in accordance with the number of the mirrors, and the tilt of the main-scanning direction.

In the case where the plurality of mirrors is presented in the optical path, the number of the mirrors relating to the respective laser beams after deflection is preferably set to be an odd number or an even number. In other words, as shown in FIG. 2, the number of the mirrors after deflection relating to the laser beam LB is one (odd number) excepting the polygonal mirror 5a of the polygonal mirror unit 5, and the number of the mirrors relating to each of the laser beams LC, LM, and LY is three (odd number). It is assumed that the second mirror 35 relating to any one of the laser beams is omitted. The direction of the curve of the main-scanning line, which is caused by the inclination of the lens of the laser beam (even number) passing through the optical path where the second mirror 35 is omitted, is opposite to the direction of the curve of the main-scanning line, which is caused by the inclination of the other laser beams (odd number). As a result, there occurs a color shift in reproducing a predetermined color.

Therefore, the number of the mirrors provided in the optical path of each of the laser beams L (Y, M, C, B) is set to be substantially the odd or even number in overlaying four laser beams (Y, M, C, B) to reproduce a predetermined color.

FIG. 7 is a schematic perspective view showing a support mechanism of the third mirrors 37 (Y, M, C) (second optical elements).

In FIG. 7, each of the third mirrors 37 (Y, M, C) is supported at a predetermined position of the intermediate base 1a of the laser exposer unit 1 by each of fixing sections 41 (Y, M, C), which are formed to be integral with the intermediate base 1a, and each of mirror holding plate springs 43 (Y, M, C), which are opposite to the fixing sections 41 to sandwich the corresponding mirror.

The fixing sections 41 (Y, M, C) are formed to be paired with each other at both end portions in the longitudinal direction of each of the mirrors (Y, M, C). On one of the pair of the fixing sections 41, there are formed two projections 45 for holding the mirrors 37 at two points. As shown by a dotted line of FIG. 7, ribs 46 may be used instead of two projections 45. On the other pair of the fixing sections 41, there are provided top screws 47 to movably support the mirrors by the projections along the optical axis.

The stop screws 47 move back and forth, thereby the mirrors 37 are moved in the direction of the optical axis in a state that the axis line defined by the projections 45 is used as a fulcrum. According to the above method, the inclination of the scanning direction, which is the curve of the main-scanning line, can be adjusted. However, the shift of the parallel distance (the pitch) of the sub-scanning direction cannot be corrected.

The above problem can be solved by the change of a horizontal write timing (to be described later) with reference to FIGS. 11 and 12.

FIG. 8 is a schematic cross sectional view showing a conventional multi-beam laser exposer unit.

In a case when, a diameter D of each of the photosensitive drum 58 (Y, M, C, B) is 30 mm, a distance C of each of the photosensitive drum 58 (Y, M, C, B) is 75 mm, and a synthetic focal length of the image-form lenses 27, 29 and 31 is 312 mm, a distance α from a bottom of the laser exposer unit 1 to a top of each of the photosensitive drum 58 (Y, M, C, B) is 26.1 mm in the unit shown in FIG. 2. In contrast, using same drums and same arrangement in FIG. 8, the distance β is 21.75 mm. Then, the distance α between the top of each drum 58 (Y, M, C, B) and the bottom of the laser exposer unit 1 of the present invention (shown in FIG. 2) is larger than the distance of the conventional laser exposer unit of FIG. 8.

FIGS. 9 and 10 are schematic cross sectional views showing modifications of the multi-beam laser exposer unit of FIG. 2.

In the arrangement shown in FIG. 9 has a same drums and same distance of each drums of FIG. 2, a large space is formed in the image forming unit 50B including the photosensitive drum 50B as compared with the other image forming units 50Y, 50M and 50C corresponding to the other colors. With respect to positions of the mirrors 33M, 35M, 33Y and 35Y are defined at predetermined positions. When, the positions of the mirrors 33M, 35M, 33Y and 35Y are arranged of FIG. 9, the space between the laser exposer unit 1 and the top of the drum 58B is 1.75 α compared with the space shown in FIG. 2. Also, in the arrangement of FIG. 10 has a same drums and same distance of each drums of FIG. 2, a space, which is larger than the case of FIG. 9, is formed in the image forming unit 50B. When, the positions of the mirrors 33M, 35M, 33Y and 35Y are arranged of FIG. 10, the space between the laser exposure unit 1 and the top of the drum 58B is 1.8 α compared with the space shown in FIG. 2.

Figure 11:
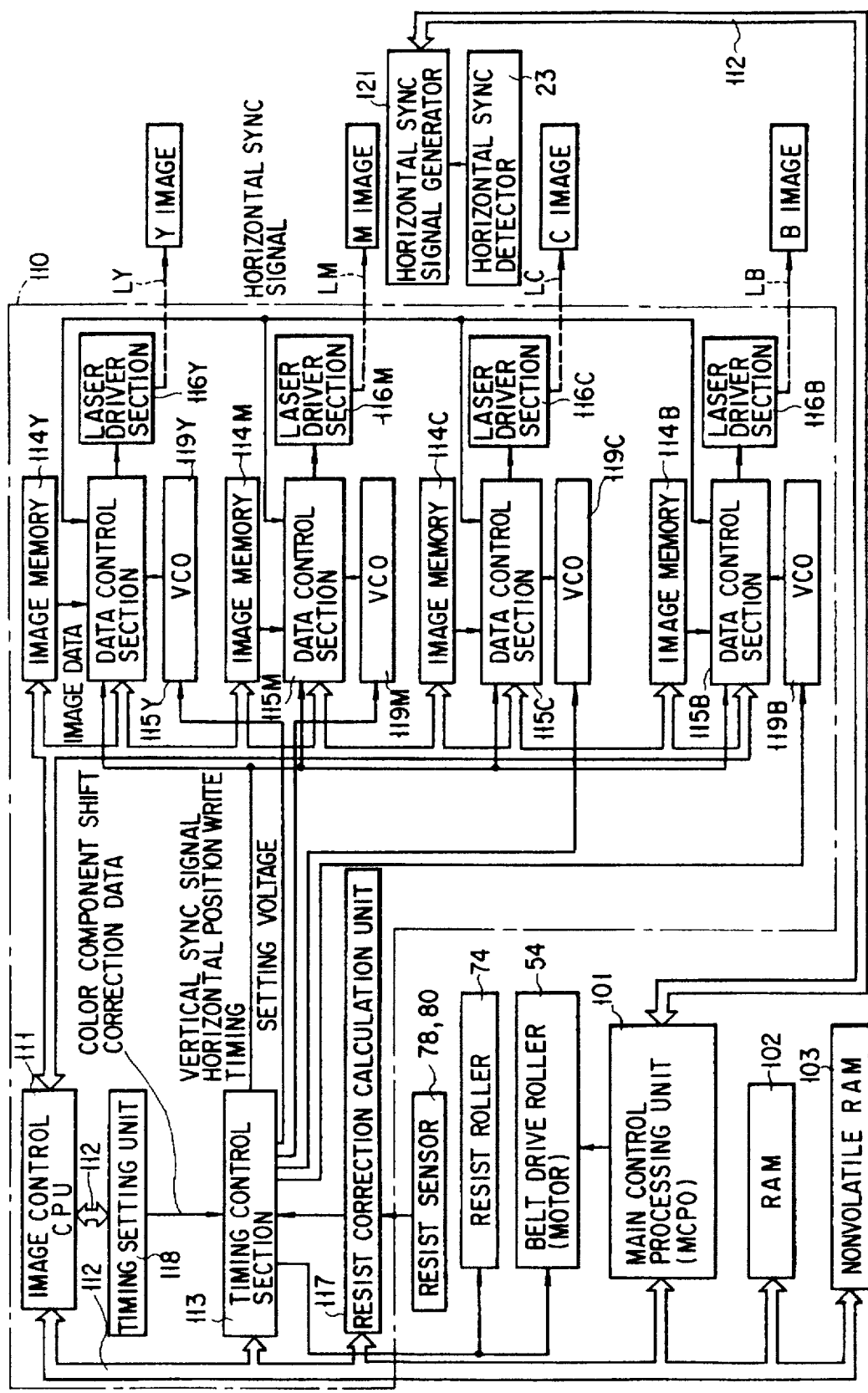
FIG. 11 is a block diagram of an image controlling section of the image forming apparatus of FIG. 1.

FIG. 11 is a schematic block diagram of an image controlling section for controlling an image forming operation of the image forming unit of FIG. 1.

An image forming unit 100 includes an image control section 110.

The image forming section 110 has a plurality of control units such as an image control CPU 111, a timing control section 113, data control sections 115Y, 115M, 115C, and 115B corresponding to the respective color separated components.

The image control CPU 111, the timing control section 113, and data control sections 115 are mutually connected to each other through a bus line 112.

A main control unit 101 is connected to the image control CPU 111. The main control unit 101 controls an operation of the mechanical elements of the image forming unit 100 such as a motor or a roller through the bus line 112. Also, the main control unit 101 controls a voltage value or an amount of current to be applied to the electrical elements such as the charge units 60, the develop units 62, or the transfer units 64.

A ROM (read only memory), a RAM 102 (random access memory), and a nonvolatile memory 103 are connected the main control unit 101. The ROM stores initial data for operating the unit 100 or a test pattern (not shown). The RAM 102 temporarily stores input image data or compensation data calculated in accordance with the outputs of the resist sensors 78 and 80. The nonvolatile memory 103 stores various compensation data obtained by an adjusting mode to be described later.

The timing control section 113 includes image memories 114 (Y, M, C, B), laser device sections 116 (Y, M, C, B), a resist compensation calculation unit 117, a timing setting unit 118, and voltage controlled oscillators (VCO) 119 (Y, M, C, B).

The image memories 114 store image data of the respective color separated components.

The laser drive sections 116 drive lasers 3 (Y, M, C, B) to provide irradiation of the laser beams to the respective photosensitive members 58 based on the respective image data stored in the image memories 114.

The resist compensation calculation unit 117 calculates an amount of compensation of timing for writing the image from the laser beams L (Y, M, C, B) based on the outputs of the first and second resist sensors 78 and 80.

The timing setting unit 118 defines timing for operating the respective mechanical elements of the respective image forming units 50 and the lasers 3 of the laser exposer unit 1.

The voltage controlled oscillators 119 correct an error of a length of a scanning line, which is peculiar to the respective image forming units 50, and a shift caused by each optical path of the laser exposer unit 1.

The timing control section 113 is a microprocessor including the RAM section for storing compensation data therein. The timing control section 113 is used in, for example, ASIC (Application Specific Integrated Circuit) based on the individual specification.

The respective data control sections 115 are microprocessors including a plurality of latch circuits and OR gates. The data control sections 115 are also used in, for example, ASIC.

The resist compensation calculation unit 117 is a microprocessor including at least four pairs of comparators and OR gate. Also, the resist compensation calculation unit 117 is used in, for example, ASIC.

The VOCs 119 are oscillators, which can vary a frequency to be output in accordance with the voltage to be applied. The VOCs 119 have a frequency variable range of about ±3. As this type of oscillators, a harmonic oscillator, an LC oscillator, or a simulated reactance variable LC oscillator can be used. Moreover, as VOC 119, there is known a circuit device in which a converter for converting an output waveform from a sine wave to a rectangular wave is incorporated.

In the respective memories 114, image data, which is sent from an outer storage unit (not shown) or a host computer, is stored.

Moreover, the output of the horizontal sync detector 23 of the laser exposer unit 1 is converted to a horizontal sync signal H-sync through a horizontal sync signal generator 121, and input to the timing control section 113 and respective data control sections 115.

The following will explain an operation of the image forming unit 100 with reference to FIGS. 1 and 11.

The image forming 100 can be operated in two modes, that is, an image forming (normal) mode for forming an image on paper P transferred through the transfer belt 52.

and a resist compensation (adjustment) mode for directly forming an image on the transfer belt 52.

The following will explain the resist compensation (adjustment) mode.

Figure 12:
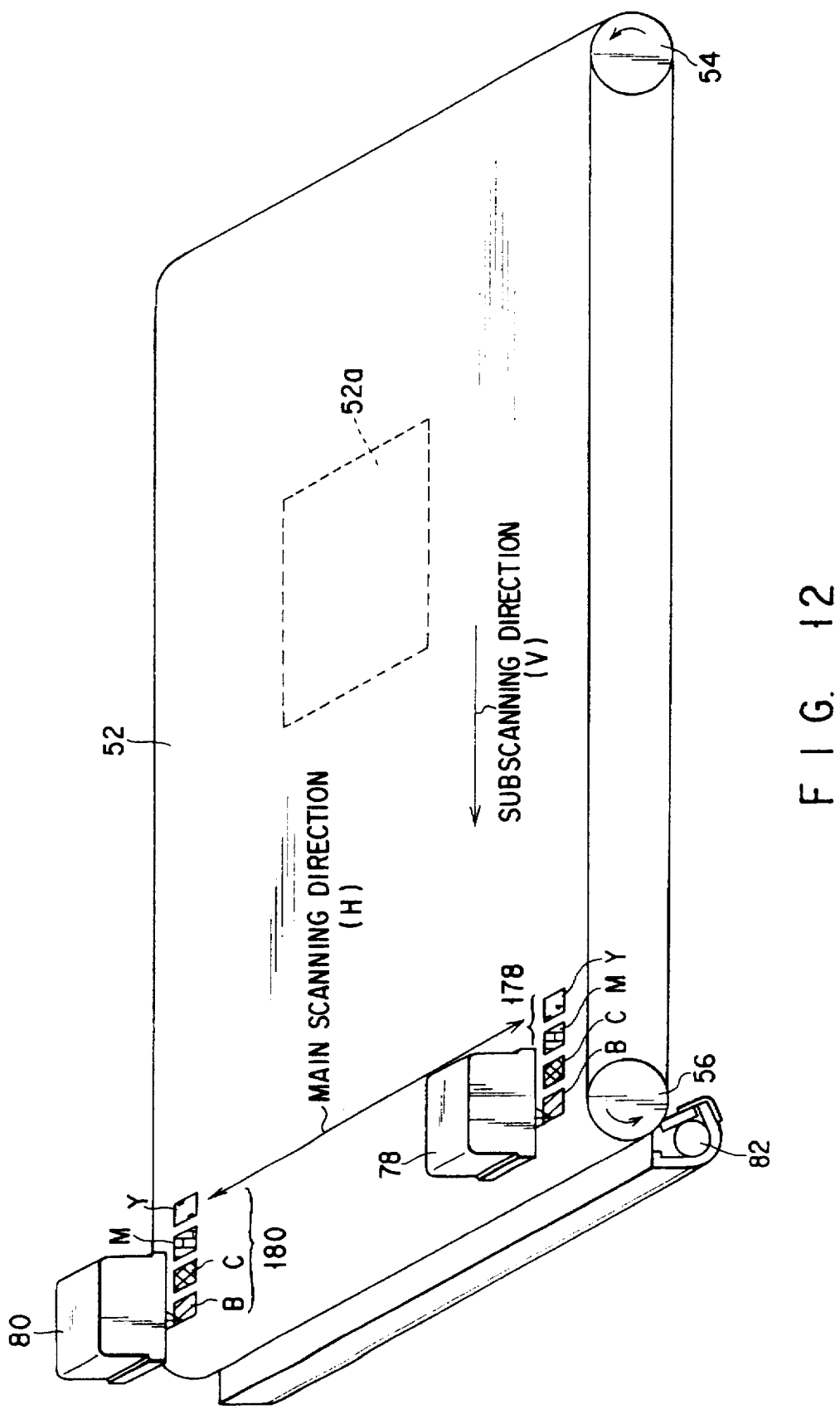
FIG. 12 is a schematic view showing a method of a resist compensation in the image forming apparatus of FIG. 1.

FIG. 12 is a perspective view showing a cut portion in the vicinity of the transfer belt of the image forming unit shown in FIG. 1 to explain the resist compensation mode. As already explained, the resist sensors 78 and 80 are arranged to have a predetermined interval in the width direction of the transfer belt 52, that is, the sub-scanning direction H. A line (imaginary line) connecting to the mutual center of the resist sensors 78 and 80 is defined to be substantially parallel to the axial line of the respective photosensitive members 58. Preferably, the line connecting to the center of the resist sensors 78 and 80 is provided to be correctly parallel to the photosensitive member 58B of the image forming unit 50B.

The belt device roller 56 is rotated in the direction of an arrow, thereby the transfer belt 52 is moved to the direction where an area 52a is directed from the roller 54 to the roller 56 (hereinafter this direction called "sub-scanning direction H"). In the resist compensation mode, two pairs of test modes 178 (Y, M, C, B) and test modes 180 (Y, M, C, B) are formed on the transfer belt 52 to have a predetermined distance in a direction perpendicular to the sub-scanning direction H, that is, a main-scanning direction V. The test images 178 and 180 are formed to correspond to image data for resist adjustment, which is stored in ROM in advance. The test images 178 and 180 are moved along the sub-scanning direction H in accordance with the movement of the transfer belt 52, and passed through the resist sensors 78 and 80. As a result, a shift between the test images 178 and 180 and the resistor sensors 79 and 80 can be detected. In the resist compensation mode, the roller 72 for feeding paper P from the cassette 70 and the fixing unit 80 are maintained to be stopped.

More specifically, the first to fourth image forming units 50 (Y, M, C, B) are driven by the control of the main control unit 101, a predetermined voltage is applied onto the surface of each of the photosensitive members 58 of each of the image forming units 50. At the same time, the polygonal mirror 5a of the polygonal mirror unit 5 of the laser exposer unit 1 is rotated at a predetermined speed by the control of the image control CPU 111 of the image control section 110.

Sequentially, image data, which corresponds to the test image fetched from ROM, is fetched to the respective image memories 114 by the control of the image control CPU 111. Thereafter, a vertical sync signal V-sync is output from the timing control section 113 based on timing data, which is set by the timing setting unit 118, and resist compensation data, which is stored in the initial RAM of the timing control section 113. In a case where resist compensation data is not stored in the internal RAM, initial data stored in the ROM is used.

The vertical sync signal V-sync, which is output from the timing control section 113, is supplied to the respective data control sections 115.

The corresponding lasers 3 are operated by the corresponding laser drive sections 116, which are based on the vertical sync V-sync, and the laser beams L emitted from the lasers 3 are detected by the horizontal sync detector 23. Then, a predetermined clock numbers of the VCO 119 (initial data stored in the ROM is used till the output is input from the resist sensors 78 and 80) is counted after the horizontal signal H-sync is counted after the horizontal sync signal H-sync is output from the horizontal sync signal generator 121. At this time, oscillation frequency data, which is initial data stored in the ROM, is supplied to the respective VOCs 119. After counting the predetermined clock. image data stored in the image memories 114 is output by a predetermined timing.

Thereafter, by the control of the respective data control sections 115, a laser drive signal corresponding to image data is output to the respective lasers from the respective laser drive sections 116. Then, the laser beams L, which are intensity-modulated, are output from the respective lasers 3 based on image data. Therefore, the electrostatic latent image, which corresponds to test image data, is formed on the respective photosensitive members 58 of the respective image forming units 50 in which the predetermined voltage is set. By use of the respective developing units 62, the electrostatic latent image is developed with toner to which the corresponding color is provided, and converted to the toner image, which is paired of four colors Two test images, each which is paired of four colors Y, M, C, B) and formed on the respective photosensitive members 58, are transferred onto the transfer belt 52 through the transfer units 64, and delivered to the resist sensors 78 and 80. When two test toner images are passed through the resist sensors 78 and 80, the resist sensors 78 and 80 output a predetermined output, which corresponds to the relative position of the respective test toner images wherein the positions of the resist sensors 78 and 80 are set as a reference position, that is, the shift of the test toner images. The test toner images formed on the transfer belt 52 are further transferred with the rotation of the transfer belt 52, and removed by the belt cleaner 82.

The respective outputs from the resist sensors 78 and 80 are input to the resist compensation calculation unit 117 to be used in the calculation of the shift of the respective test toner images.

The resist compensation calculation unit 117 detects the shift of the position of each pair of test toner images of each color, that is, 178Y and 180Y, 178M, and 180M, 178C, and 180C, and 178B and 180B formed to be separated by a predetermined distance in the sub-scanning direction. After the detection, the unit 117 calculates the average value, and defines an amount of compensation Vr of timing to output the vertical sync signal V-sync based on the difference between the calculated average value and the predetermined design value. Whereby, the shift, which is caused by the overlap of four images, in the sub-scanning direction is removed. In other words, the light-emitting timing of the respective lasers 3 of the exposer unit 1 is adjusted. In other words, the shift, which is caused when the distances between the respective image forming units 50 are different from each other, are removed. Then, there is removed the shift between the respective laser beams L emitted from the laser exposer 1 in connection with the distance in the sub-scanning direction.

Moreover, the resist compensation calculation unit 117 detects the shift of the position of each of the test toner images 178 (Y, M, C, B) in the main-scanning direction. After the detection, the unit 117 calculates the average value, and defines an amount of compensation Hr of timing to output image data after the output of the horizontal sync signal H-sync based on the difference between the calculated average value and the predetermined design value. Whereby, there is adjusted timing in which the laser beams L, which are emitted from the respective lasers 3 of the laser exposer unit 1, are intensity-modulated by image data. In other words, the writing position of image data to be recorded onto the respective photosensitive members 58 of the respective image forming units 50 is adjusted in the main-scanning direction.

Furthermore, the resist compensation calculation unit 117 detects the shift of the position of each pair of test toner images of each other, that is, 178Y and 180Y, 178M and 180M, 178C and 180C, and 178B and 180B in the main-scanning direction. After the detection, the unit 117 calculates the average value, and defines an amount of compensation Fr of the oscillation frequency to be output from VOCs 119 based on the difference between the calculated average value and the predetermined design value.

Whereby, the length of the respective laser beams in the main-scanning direction per one clock, that is, the length of one line in the main-scanning direction to be image-formed on the respective photosensitive members 58, is adjusted.

The above amounts of compensation Vr, Hr, and Fr, which are obtained by the resist compensation calculation unit 117, are temporarily stored in the RAM of the timing control section 113. In this case, Vr, Hr, and Fr may be stored in the nonvolatile RAM 103. Moreover, these compensation operations are executed by the predetermined timing such as time when the compensation mode is selected by a control panel (not shown), time when a power supply switch (not shown) of the image forming unit 100 is turned on, or time when a number of papers to be printed, which is counted by a counter (not shown), reaches a predetermined number of papers.

The following will explain the image forming (normal) mode.

An image forming start signal is supplied by a control panel (not shown) or a host computer, so that the respective image forming units 50 are wormed up by the control of the main control unit 101, and the polygonal mirror 5a of the polygonal mirror unit 5 is rotated at a predetermined rotation speed by the control of the image control CPU 111.

Sequentially, image data to be printed is fetched to the RAM 102 from the outer memory unit, the host computer, or the scanner (image reading unit). A part (or all) of image data fetched into the RAM 102 is stored in each image memories 114 by the control of the image control CPU 111 of the image control unit 110. Moreover, the feeding roller 72 is driven by the control of the main control unit 101 in a state that a predetermined timing such a vertical sync signal v-sync is used as a reference, thereby one paper P is picked up from the paper cassette 70. Then, the respective toner images Y, M, C, and B, which are provided by the image forming units 50, and the timing are adjusted by the resist roller 74. The picked up paper P is adhered to the transfer belt 52 by the absorption roller 76, and guided to the respective image forming units 50 in accordance with the rotation of the transfer belt 52.

On the other hand, at the same time with the paper feeding and transferring operations, the vertical sync signal V-sync is outputted from the timing control unit 113 based on data set by the timing setting unit 118, resist data read from the internal RAM of the timing control unit 113, and clock data.

When the vertical sync signal V-sync is output from the timing control unit 113, the respective laser drive units 116 are driven by the respective data control units 115. Then, irradiation of each of the laser beams for one line in the main-scanning direction is provided to the respective photosensitive members 58 of the respective image forming units 50 form the respective lasers 3.

The number of clocks of the respective VCOs 119 is counted just after the input of the horizontal sync signal H-sync, which is generated by the horizontal sync signal generator 121, based on the laser beam for one line. When the number of clocks of the respective VCOs 119 reaches a predetermined value, image data to be printed read from the respective image memories 114. Sequentially, in order to intensity-modulate the respective laser beams from the respective lasers 3, image data is transferred to the respective laser drive units 116 by the control of the respective control units 115, so that an image having no shift is formed on the respective photosensitive members 58 of the respective image forming units 50.

As a result, the respective laser beams, which are guided to the respective photosensitive members 58, are correctly image-formed on the respective photosensitive members 58. At this time, no influence of the deviation of the optical path, which is form the respective lasers 3 to the respective photosensitive members 58, is exerted on the above image formation. Moreover, the above image formation is not influenced by the variation of the position of each photosensitive member 58, which is caused by the deviation of the diameter of the respective photosensitive members 58.

Each of the photosensitive members 58 is charged to a predetermined potential, and the potential is changed based on image data, whereby an electrostatic latent image corresponding to image data is formed on each of the photosensitive members 58. Each of the developing units 62 develops the electrostatic latent image with toner having a corresponding color to be converted to an toner image.

Each toner image is moved to paper P, which is delivered by the transfer belt 52, with the rotation of each of the photosensitive member 58, and transferred onto paper P on the transfer belt 62 at a predetermined timing by the transfer unit 64.

Whereby, the toner image in which four colors are correctly overlaid on paper P is transferred on paper P. After the toner image is transferred onto paper P, the residual toner and the residual voltage, which are left on the respective photosensitive members 58, are removed by the respective cleaners 66 and the respective discharge lamps 68 to be used in the sequential image formation.

Paper P in which the four-colored toner image is electrostatically maintained is further transferred with the rotation of the transfer belt 52, and separated from the transfer belt 52 by the difference between the curvature of the belt drive roller 56 and linearity of paper P to be guided to the fixing unit 84. Paper P guided to the fixing unit 84 is discharged to a discharge tray (not shown) after toner is melted and the toner image as a color image is fixed by the fixing unit 84.

On the other hand, the transfer belt 52 in which paper P is already supplied to the fixing unit 84 is further rotated. As a result, undesired toner left on the surface is removed by the belt cleaner 82, and the transfer belt 52 is used in the transfer of paper P to be supplied from the cassette 70.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical exposer unit comprising:

scanning means for continuously reflecting a plurality of light beams toward a scanning object;

image-forming means for image-forming the light beams reflected by said scanning means on a predetermined position of the scanning object; said image-forming means including:

optical means for providing a predetermined optical characteristic to each of the light beams by making the light beams intersect with each of the light beams between a first lens and a second lens;

first reflecting means provided between said optical means and the scanning object with respect to the light beams; and second reflecting means, provided at the side of the scanning object rather than said first reflecting means with respect to the light beams, for crossing at least two of the light beams reflected by the first reflecting means with each other so as to further reflect the light beams toward the scanning object.

2. The optical exposer unit according to claim 1, wherein said second reflecting means of said image-forming means reflects at least one of the light beams reflected by said first reflecting means such that an angle formed by an incident angle and a reflection angle is obtuse so as to be guided to the scanning object.

3. The optical exposer unit according to claim 2, further comprising:

second optical means, provided in a front state of the scanning means, for putting the plurality of light beams together to form a group of light beams as one flux of light ray.

4. The optical exposer unit according to claim 1, wherein said first reflecting means of said image forming means includes i number of reflectors for reflecting a first one of the laser beams toward the scanning object and said second reflecting means of said image forming means includes j number of reflectors for reflecting a second one of the laser beams toward the scanning object, wherein at least two or more reflectors of said first reflecting means are provided with respect to the first one of the light beams passing through the farthest position from the scanning object to sandwich an optical axis therebetween among the light beams passed through said optical means, and wherein at least two or more reflectors of said second reflecting means are provided with respect to the second one of the light beams passing through a position between the first light beam and the optical axis, and the reflectors of each of said first and second light reflecting means are arranged such that the second one of the light beams directing from a reflector j-1 of said second reflecting means to a reflector j is passed between a reflector i-1 of said first reflecting means and a reflector i-2 of said first reflecting means.

5. The optical exposer unit according to claim 4, wherein said second reflecting means of said image-forming means reflects at least one of the light beams reflected by said first reflecting means such that an angle formed by an incident angle and a reflection angle is obtuse so as to be guided to the scanning object.

6. An optical exposer unit comprising:

a first light source for emitting a first light beam corresponding to a first image;

a second light source for emitting a second light beam corresponding to a second image;

first optical means for putting the first and second light beams sent from said first and second light sources together to form a group of light beams as one flux of light ray;

scanning means for continuously reflecting the group of light beams put together by said first optical means toward a scanning object;

a second optical means including first and second lenses, for decreasing a difference in optical characteristic between the first light beam and the second light beam by making the light beams intersect with each of the light beams between the first and second lenses;

first reflecting means including i number of reflectors, and a number of said first reflecting means being at least two or more with respect to the first light beam passing through the farthest position from the scanning object to sandwich an optical axis therebetween among said light beams passed through said second optical means; and second reflecting means including j number of reflectors, and a number of said second reflecting means being at least two or more with respect to the second light beam passing through a position between the first light beam and the optical axis, said second light reflecting means arranged such that the light beam directing from a reflector j-1 of said second reflecting means to a reflector j is passed between a reflector i-1 of said first reflecting means and a reflector i-2, and said second reflecting means reflecting the first light beam such that an angle formed by an incident angle and a reflection angle is obtuse so as to be guided to the scanning object.

7. An image forming apparatus comprising:

a plurality of image carrier members;

an optical exposer unit, having:

a plurality of light sources arranged to correspond to said plurality of image carrier members, scanning means for continuously reflecting light beams emitted from said plurality of light sources toward a predetermined position of the corresponding image carrier members, optical means for providing a predetermined optical characteristic to each of said plurality of the light beams by making the light beams intersect with each of the light beams between a first lens and a second lens, and image-forming means for image-forming the light beam reflected by said scanning means onto a predetermined position of said image carrier member, said image forming means including first reflecting means provided between said optical means and said image carrier member with respect to each of said plurality of the light beams, and second reflecting means, provided at the side of said image carrier member rather than said first reflecting means with respect to each of said light beams, for crossing at least two of the light beams reflected by said first reflecting means with each other so as to further reflect the light beams toward said image carrier member; and a developing unit for supplying developing agent to a latent image formed on said image carrier member by said laser exposer unit so as to form a developing image.

8. The optical exposer unit according to claim 4, wherein said i number of reflectors of said first reflecting means are provided on a single mirror block, and wherein a number k corresponding to said plurality of said light beams is one more than i.

9. The optical exposer unit according to claim 8, wherein the single mirror block includes a passing area and a number of reflecting surfaces equal to p, wherein p is equal to i, wherein each of the reflecting surfaces is configured to bend one or more of the laser beams to the scanning means, and wherein the passing area is configured to direct another of the laser beams to the scanning means.

10. The optical exposer unit according to claim 9, wherein each of the first through i-th reflecting surfaces are formed at a predetermined angle with respect to the plurality of the laser beams incident thereupon.

11. The optical exposer unit according to claim 10, wherein each of the first through i-th reflecting surfaces are coated with a material having a high reflectance, and wherein each of the first through i-th reflecting surfaces are polished.

* * * * *